(12) United States Patent
Dörfler et al.

(10) Patent No.: US 11,794,610 B2
(45) Date of Patent: Oct. 24, 2023

(54) VALVE, VALVE ASSEMBLY, AND SEAT COMFORT SYSTEM

(71) Applicant: Alfmeier Präzision SE, Treuchtlingen (DE)

(72) Inventors: Erich Dörfler, Landsberg (DE); Matthias Mitzler, Graben (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 17/693,636

(22) Filed: Mar. 14, 2022

(65) Prior Publication Data
US 2022/0289076 A1    Sep. 15, 2022

(30) Foreign Application Priority Data
Mar. 15, 2021    (DE) .......................... 102021106253.5

(51) Int. Cl.
*B60N 2/02*    (2006.01)
*B60N 2/66*    (2006.01)
(Continued)

(52) U.S. Cl.
CPC ........... *B60N 2/0224* (2013.01); *B60N 2/665* (2015.04); *F16K 31/005* (2013.01);
(Continued)

(58) Field of Classification Search
CPC ........ B60N 2/0224; B60N 2/665; B60N 2/90; B60N 2/914; G01F 1/56; G01F 1/68; G01F 1/76; G05D 7/0635; Y10T 137/7761; F16K 37/00; F16K 37/005; F16K 37/0041; F16K 31/005; F16K 31/06; F16K 31/025
(Continued)

(56) References Cited

U.S. PATENT DOCUMENTS

| | | |
|---|---|---|
| 3,818,933 A | 6/1974 | Bubniak et al. |
| 4,391,247 A | 7/1983 | Shioyama et al. |

(Continued)

FOREIGN PATENT DOCUMENTS

| | | |
|---|---|---|
| CN | 109578350 A | 4/2019 |
| DE | 60116951 T2 | 7/2006 |

(Continued)

OTHER PUBLICATIONS

Song, Hunter; Resistance modeling of SMA wire actuators, International Workshop, Smart Materials, Structures & NDT in Aerospace, Nov. 2-4, 2011, Montreal, Quebec, Canada, 2011.
(Continued)

*Primary Examiner* — William M McCalister
(74) *Attorney, Agent, or Firm* — JK Intellectual Property Law, PA

(57) ABSTRACT

A valve includes a valve housing defining at least one first opening and at least one second opening, the valve housing enclosing a valve chamber. An actuator with a positioning element is configured for opening or closing the valve. Also provided are at least one air mass measuring device for measuring an air mass flowing through the valve or at least one measuring wire of an air mass measuring device for measuring an air mass flowing through the valve. A valve arrangement and a seat comfort system are also disclosed.

7 Claims, 5 Drawing Sheets

(51) Int. Cl.
  *G05D 7/06* (2006.01)
  *F16K 31/02* (2006.01)
  *F16K 31/00* (2006.01)
  *G01F 1/56* (2006.01)
  *G01F 1/68* (2006.01)
  *G01F 1/76* (2006.01)
  *F16K 31/06* (2006.01)
  *B60N 2/90* (2018.01)
  *F16K 37/00* (2006.01)

(52) U.S. Cl.
  CPC .......... *F16K 31/025* (2013.01); *F16K 37/005* (2013.01); *G05D 7/0635* (2013.01); *B60N 2/90* (2018.02); *B60N 2/914* (2018.02); *F16K 31/06* (2013.01); *F16K 37/00* (2013.01); *F16K 37/0041* (2013.01); *G01F 1/56* (2013.01); *G01F 1/68* (2013.01); *G01F 1/76* (2013.01)

(58) Field of Classification Search
  USPC ...................................................... 137/487.5
  See application file for complete search history.

(56) References Cited

U.S. PATENT DOCUMENTS

| | | | |
|---|---|---|---|
| 4,655,505 A | 4/1987 | Kashiwamura et al. | |
| 5,421,365 A * | 6/1995 | Matsuo | G05D 7/0635 137/486 |
| 5,439,026 A * | 8/1995 | Moriya | G05D 7/0635 137/884 |
| 5,441,076 A * | 8/1995 | Moriya | G05D 7/0635 137/884 |
| 5,901,741 A * | 5/1999 | Mudd | G01F 1/6842 251/303 |
| 6,062,077 A * | 5/2000 | Azima | G05D 7/0635 73/204.27 |
| 6,088,643 A | 7/2000 | Long et al. | |
| 10,457,180 B2 | 10/2019 | Bauer et al. | |
| 2002/0139183 A1 * | 10/2002 | Azima | G05D 7/0635 73/204.27 |
| 2016/0178420 A1 * | 6/2016 | Sasaki | B23K 11/18 73/204.27 |
| 2017/0043681 A1 | 2/2017 | Seiller et al. | |
| 2020/0367572 A1 | 11/2020 | Hejazi et al. | |
| 2022/0289076 A1 | 9/2022 | Dörfler et al. | |

FOREIGN PATENT DOCUMENTS

| | | |
|---|---|---|
| DE | 102009035617 A1 | 5/2010 |
| DE | 102015113029 A1 | 10/2016 |
| DE | 102015213442 B4 | 1/2017 |
| DE | 102015214569 A1 | 2/2017 |
| DE | 102016225519 A1 | 6/2018 |
| DE | 102017112803 A1 | 12/2018 |
| DE | 102019119646 A1 | 1/2021 |
| EP | 0940742 A2 | 9/1999 |
| EP | 1170534 A2 | 1/2002 |
| EP | 3733451 A1 | 11/2020 |
| WO | WO 2005/026592 A2 | 3/2005 |
| WO | WO 2005/026592 A2 | 3/2005 |

OTHER PUBLICATIONS

Wikipedia; Luftmassenmesser; Jan. 23, 2020; downloaded Jan. 14, 2022, with English Translation.
Sven Langbein, et al., *Formgedächtnistechnik*, 2013, pp. 38-39.
GPTO Office Action dated Jan. 21, 2022, for DE Application No. 10 2021 106 253.5 with English translation.
European Search Report for Application No. EP22161707, dated Aug. 22, 2022, with English translation.
European Search Report for Application No. EP22161711, dated Aug. 17, 2022, with English translation.
U.S. Office Action for U.S. Appl. No. 17/693,650, dated Apr. 19, 2023.
GPTO Office Action dated Jan. 26, 2022, for DE Application No. 10 2021 106 252.7 with English translation.

* cited by examiner

VALVE, VALVE ASSEMBLY, AND SEAT COMFORT SYSTEM

CROSS-REFERENCE TO RELATED APPLICATIONS

The present application claims the benefit of German Patent Application No. DE 10 2021 106 253.5, filed Mar. 15, 2021, and incorporated by reference herein.

TECHNICAL AREA

The disclosure pertains to a valve, especially a valve of a seat comfort system. The disclosure furthermore pertains to a valve arrangement and a seat comfort system.

BACKGROUND

According to the state of the art, a circuit arrangement is known, for example, from DE 10 2017 112 803 A1 to control a system, especially a lumbar support having at least two air cushions. The known circuit is thus suitable for a seat comfort system.

A seat comfort system is a system for a seat comfort function of a seat, which can be a car seat. For example, such a seat comfort system can include a pneumatic lumbar support and/or a massage device for a seat. Typically, a seat comfort system consists of a plurality of air cushions, to which when necessary the desired pressure that changes over time can be applied when they are filled. To accomplish this, the seat comfort system encompasses one control unit, one pump to apply compressed air to the air cushion and a plurality of valves, whereby expediently at least one valve is assigned to each air cushion. Each of these valves can include an actuator with an SMA element (SMA: shape memory alloy), therefore an element consisting of a shape memory alloy, which depending on the energization of the valve, can be moved to an opened, partially opened or closed functional state. Generally, the SMA element is an SMA wire. The power supply must typically be maintained within a very narrowly defined range in order to ensure a reliable activation of the actuator and still prevent a thermal overload and hence a permanent damage of the SMA element. Therefore, sensors to monitor the current, voltage and/or temperature are expediently assigned to the control unit.

FIG. 1A, FIG. 1B and FIG. 1C show a circuit arrangement consisting of several valves 120 of a seat comfort system 2 according to the state of the art. The circuit arrangement 1 is suitable, for example, for controlling the valves of a seat comfort system 2 that includes a lumbar support device having at least two air cushions (not shown). Thus, such a seat comfort system 2 consists of at least two air cushions, which include at least one valve 120 (see FIG. 1B, FIG. 1C), especially at least one valve 120 each. Such a valve 120 includes, as exemplarily shown in FIG. 1B, one valve housing 102 and one actuator 103. The valve housing 102 contains a first opening 105 and a second opening 106. The housing encloses a valve chamber 109. The actuator 103 includes one SMA element 100 executed as an SMA wire arranged in V-shape, and a positioning element 104 movable with the SMA element 100 and is equipped with a sealing element 108 to either open or close the first opening 105. The first opening 105 is open in a first position of the positioning element 104 and closed in a second position of the positioning element 104.

From WO 2005/026592 A2 it is known that such a valve can have a limit switch 107 that closes when the second position is reached. By means of this limit switch it is possible to partially or fully lower the heat supplied to the SMA element 100. Moreover, a circuit with a temperature sensor that adjusts the heat output to the ambient temperature is known from WO 2005/026592 A2.

Alternately to the actuator with a V-shaped SMA element shown in FIG. 1B, an actuator 103 with a linear or U-shaped SMA element 100 is known in which the positioning element 104 can be formed from a leaf spring, from example, on whose first end the SMA element 100 engages. Such an embodiment is shown in FIG. 1C. In this case, the sealing element 108 can be held in a through-hole 104a of the positioning element 104 on the first end of the positioning element 104. In the example shown, the positioning element 104 is arranged with its other end between a baseplate 111 and a board or circuit board 110, whereby the SMA element 100 can be held and contacted by means of a crimp 101.

The circuit arrangement shown in FIG. 1A is suitable for energizing and switching several SMA elements 100-1 to 100-N. The SMA elements 100-1 to 100-N are connected to a voltage source U shown with an arrow. To accomplish this, the circuit arrangement 1 includes a control unit 30. Furthermore, a temperature sensor 70 for measuring the ambient temperature of the SMA elements 100 and/or a voltage sensor 71 can be present. The control unit 30 is connected to a pulse width modulation device 60. By means of the pulse width modulation device 60, it is possible to control the SMA elements 100-1 to 100-N by means of pulse width modulation, whereby depending on the measured supply voltage and temperature, the duty cycle of the pulse width modulation, i.e. the ratio of pulse width to period duration, is set. A circuit for a pulse width modulation is known, for example, from DE 10 2017 112 803 A1. By means of the respective driver 20-1 to 20-N, the assigned SMA element 100-1 to 100-N can be successively energized. To prevent current peaks, series resistors 21-1 to 21-N can be present. Furthermore, the circuit arrangement can also include a limit switch or a feedback device 38. The feedback device 38 is either connected to the pulse width modulation device 60 (as shown) or alternately to the control unit 30 and is suitable to signal to the pulse width modulation device 60 or control unit 30 that an end position of the actuator has been reached, which is mechanically detected.

A pneumatic valve with an actuator and movable shut-off elements is known from DE 10 2016 225 519 A1, whereby the actuator is activated by an SMA element that can be deformed by electrical heat output. To activate the actuator, the SMA element is supplied with electrical heat, whereupon the SMA element deforms in a known way, bringing about a predetermined movement of the sealing element to open or close an air supply. The deformation of the SMA element is reversed when the electric heat output ends, whereby a reversal of the predetermined movement of the SMA element is brought about. The known actuator also includes a detection unit to detect that an end position has been reached and left. In the embodiment shown, the end position is achieved by bridging a section of the SMA element and measuring a reduced resistance caused by the bridging.

A control device for adjusting air cushions is known from DE 10 2015 113 029 A1. For control purposes, the run time of a pump is recorded and an air quantity or air volume supplied to the at least one air cushion is determined taking the pump capacity into consideration.

A process to monitor the pressure in a pneumatic seat adjustment device is known from DE 10 2015 213 442. To this end, the pressure is measured in each air chamber or in a supply channel with a pressure sensor.

The known processes are based on the fact that in each case, a type of circuit is activated by a toggle switch or a bridging in a certain position of the positioning element. The function of such mechanical switches can be affected not only by dirt particles, abrasion and fluids, but also by a high switching frequency.

SUMMARY

The task of the disclosure is to specify a new valve, especially a valve improved valve with regard to the state of the art. Another task is to specify a valve arrangement and a seat comfort system with such valves.

With regard to the valve, the valve arrangement, and the seat comfort system, the tasks are solved by subject matter as disclosed herein. Useful designs result from the disclosed subject matter.

The valve according to the disclosure is, for example, a valve of a seat comfort system. The seat comfort system can include one or more valves. The seat comfort system can be installed, for example, in a car seat or already be installed there. The seat comfort system can be a lumbar support device and/or massage device, for example. Typically, the seat comfort system encompasses one or several air cushions that are generally arranged in a seat, especially in a car seat.

The valve according to the disclosure includes a valve housing, whereby the valve housing can have, for example, a housing cover, a housing bottom, and an intermediate housing arranged between the housing cover and the housing bottom. The valve housing has at least a first opening and at least a second opening, and the valve housing encloses a valve chamber, which can include a flow chamber and an activation chamber. The valve includes an actuator with a positioning element for closing and opening the valve, for example of the first and/or second opening or of an opening inside the valve, for example of an opening between the flow chamber and the activation chamber as well as, expediently, a return element. The positioning element, in particular, can be adjusted between a first position and a second position. Within the meaning of this application, the first position and second position are two positions different from one another that can be selected as opening and closing position of the valve or as intermediate positions. The actuator can include, for example, a piezoelectric element or a magnetic element, especially an electromagnetic element, or an SMA element (shape memory alloy element).

The valve according to the disclosure includes at least one air mass measuring device for measuring an air mass flowing through the valve or at least one measuring wire of an air mass measuring device for measuring an air mass flowing through the valve.

The air mass flowing through the valve can be determined, as will be explained in more detail below, by means of a measuring wire on which the air mass to be measured flows by, thereby causing, for example, a change in temperature in or near the measuring wire. By means of the air mass flowing through the valve, it can therefore be determined—or at least estimated—how much air or what air quantity is present in an assigned air cushion of the seat comfort system, for example. To this end, the measured values of the air mass measuring device can be compared, for example, with the saved reference values and/or parallel reference measurements in areas where there is no air flow, for example on additional reference measuring wires.

Therefore, an advantage of the disclosure is that the air mass, and thus the quantity of air that flows through the valve, can be determined with the valve. By means of the air mass flowing through the valve it can therefore be determined, or at least estimated for example, how much air is in an assigned air cushion such as one of a seat comfort system.

The air mass measuring device can include at least one measuring wire, whereby the measuring wire is arranged inside the valve housing and/or in the valve chamber and/or in the first opening and/or in the second opening. For example, the measuring wire can be arranged in the flow chamber of the valve.

Moreover, the air mass measuring device can include a measuring device for measuring the physical values of the measuring wire. The measuring device, in turn, can include for example a. one resistance measuring device for measuring the resistance of the measuring wire, and/or
b. one temperature sensor and/or one temperature measuring device for measuring a temperature of the measuring wire and/or the ambient temperature of the measuring wire, and/or
c. one current measuring device for measuring a heating current of the measuring wire, and/or
d. one power measuring device for measuring an input power of the measuring wire.

The change of the measured values determined with the measuring device depends on the quantity of heat that the air sweeping by removes from the measuring wire and is thus an indicator for the air mass to be determined. Within the meaning of this disclosure, resistance should be understood as the electrical resistance.

According to a further development, the measuring device is part of a circuit arrangement to control the valve, whereby the circuit arrangement has at least one drive unit to activate the actuator and one control unit to control the drive unit, and whereby the control unit is suitable for processing an output signal of the measuring device of the air mass measuring device.

The control unit is thus configured in such a way that it processes an output signal and with it a measurement result of the air mass measuring device, and therefore uses this measurement result, for example, for controlling the drive unit to activate the actuator when for example a specified threshold value of the air mass flowing through or air quantity closes the valve. Thus, when the air cushions are filled or emptied, the valve according to the disclosure makes it possible to detect, especially in a contact-free way, one or several specified filling levels of the air cushion and can control or regulate the valve accordingly, such as closing or opening it.

The air mass measuring device thus generates, based for example on the measurement of the temperature and/or heating current and/or electrical power consumption and/or resistance of at least one measuring wire of the air mass measuring device and/or the change of these measurement values over time, an output signal that indicates the air mass that flowed through the valve and therefore the air quantity as well. This output signal is transmitted to the control unit, so that the control unit can control or regulate the drive unit, for example, based on the measured air mass or air quantity.

The output signal of the respective measuring device explained above is transmitted to the control unit so that it can control or regulate the drive unit based on the measured value of the measuring device. To accomplish this, the circuit arrangement can be configured so that either the resistance, the current and/or the performance of the measuring wire is/are measured or an energization takes place, thereby operatively connecting measuring device and drive unit alternately with the measuring wire, which is especially expedient when the measuring wire is an SMA element (i.e. an SMA wire) that is simultaneously an element of the actuator of the valve. This will be explained in more detail below. In case of a temperature measurement, the measurement and control of the drive unit can take place at the same time or alternatingly. It can be provided that the control unit also controls the resistance measuring device and/or the temperature sensor and/or the temperature measuring device and/or the current measuring device and/or the power measuring device.

An embodiment provides that the actuator of the valve has an SMA element. In this case, it can be for example an SMA wire, understood to be here a wire- or strip-shaped SMA element. The SMA wire can then be the measuring wire or one of the measuring wires of the air mass measuring device. If necessary, one or several additional measuring wires of the air mass measuring device can be provided. A further development of this embodiment provides that the air mass measuring device includes one measuring device, especially a resistance measuring device, and that the circuit arrangement is designed for this purpose so the measuring device and the drive unit are operatively connected in an alternative way to the SMA element, specifically to the SMA wire. This alternating control can be implemented by the appropriately configured control unit. Thus, either the air mass is measured with the SMA wire in its function as measuring wire or the SMA wire is energized in its function as actuator. These two functions are alternatingly performed, which means that the air mass measuring device and drive unit are operatively connected in an alternate way to the SMA wire. To accomplish this, the control unit can especially also control the air mass measuring device apart from the drive unit.

Apart from the SMA element, at least one separate wire (i.e. a wire provided in addition to the SMA element) can be provided, whereby the separate wire is the measuring wire or one of the measuring wires of the air mass measuring device. If necessary, one or several additional measuring wires of the air mass measuring device can be provided, whereby the SMA element can also be an SMA wire provided as another measuring wire.

The separate wire is therefore arranged separately from the SMA element of the actuator. This separate wire can be a wire made from an SMA material or from another metallic material such as tungsten or platinum, or from an alloy. The separate wire can be connected, for example, in parallel to the SMA element or elements, but controlled differently from them, i.e. separately from these SMA elements.

In an embodiment, the valve can have additional sensors for monitoring the current, voltage and/or temperature. The valve, especially the control unit, can have communication interfaces in the embodiment in order to be controlled by switches and/or a computer on board in a car. As another input, the valve—in particular the control unit—can have a LIN (local interconnect network) communication interface having especially a transceiver and/or a switch input interface. The switch input interface is especially suitable for processing resistance-based switch signals, whereby the switch input interface can be designed for a plurality of switch inputs, e.g. for adjusting the seat, in particular the seat position, and for lumbar and/or massage functions. The control unit can include a memory for saving data.

The valve housing can at least have one valve opening leading, from example, from the flow chamber to the activation chamber, whereby a positioning element inside the activation chamber axially movable between a closing position to close the valve opening and an opening position to release the valve opening, a wire- or strip-shaped SMA element made of a shape memory alloy that serves to activate the positioning element in opening direction, a return element that serves to move the positioning element in closing direction, and a circuit board are arranged, whereby the SMA element is fixed to the positioning element with at least one section and is electrically connected to the circuit board with at least one end for applying current.

In a useful embodiment, the SMA element is fixed to the positioning element with a middle section and connected to the circuit board with both ends.

In another embodiment, the air mass measuring device and/or the control unit are configured in a way to determine the air mass from the temperature of the measuring wire and of the heating current, and/or the temperature of the measuring wire and of the input power, and/or the resistance of the measuring wire and of the heating current, and/or the resistance of the measuring wire and of the input power.

The circuit arrangement addressed above to control the valve, especially the measuring device, can include an evaluation unit or be connected to an evaluation unit. The evaluation unit can, for example, receive and evaluate specific measurement values of the air mass measuring device, such as resistance measurement values, temperature values, current intensities and/or power values, generate an output signal from them that is transmitted to the control unit. This output signal can especially include a signal for transmitting that an end condition has been reached.

In an embodiment, the circuit arrangement includes an ASIC (application-specific integrated circuit) having one or several of the following components: the drive unit, especially with one or several SMA drivers, one or the aforementioned measuring device of the air mass measuring device, especially with an evaluation unit and/or a memory, and the control unit. The embodiment with an ASIC makes it possible to manufacture a smaller-sized circuit arrangement, which is more economical. At the same time, the measuring device can be, as explained above, a temperature measuring device, resistance measuring device, current measuring device and/or power measuring device.

In another embodiment, the valve and/or the circuit arrangement includes additional sensors, particularly an end position switch. Such an end position switch can serve, for example, both as a safety measure and calibration aid.

In an embodiment, the circuit arrangement is assigned to a plurality of valves and thus includes a plurality of actuators, whereby one drive unit, especially a drive unit having an SMA driver is assigned to each actuator for activating the respective actuator or an SMA driver in a drive unit for each actuator. Expediently, the circuit arrangement includes a multiplexer connected in such a way to each one of the SMA elements of the actuator that the resistance of each SMA element can be individually measured. In this way, by means of the multiplexer, each SMA element can be consecutively connected to the resistance measuring device to measure the resistance.

In another embodiment, the circuit arrangement, for example, the evaluation unit and/or the control unit, includes a memory for saving the data. The memory can alternately also be a joint memory of the evaluation unit and the control unit.

It can be provided that the evaluation unit and/or the control unit evaluate(s) a sequence of successively measured values, especially temperature measured values, current measured values, resistance values or (input) power values of the same SMA element and/or compare(s) measured values with one or several specified values.

The control unit is designed, for example, to control by means of pulse width modulation. To accomplish this, the control unit includes, for example, a pulse width modulation unit so the SMA elements are energized and therefore heated consecutively within a duty cycle via the assigned SMA drivers of the driver unit for a specified pulse width and pulse height. In an embodiment, the pulse width modulation unit can emit a time signal to the measuring device, for example to a resistance measuring device, and/or the air mass measuring device.

It can also be provided that the circuit arrangement, especially the measuring device and/or the evaluation unit, have a signal amplifier and/or a noise suppressor.

The measuring device, especially the resistance measuring device, includes in an embodiment two or more multiplexers, each one connected to a part of the SMA elements. This embodiment is possible for large systems having a plurality of SMA elements. For example, 20 SMA elements can be provided per multiplexer.

Expediently, a series resistor is in each case connected in series between measuring device, especially resistance measuring device, and SMA element. This series resistor serves essentially to reduce power peaks, thereby lowering the danger of an overload of the SMA elements.

It can also be provided that the valve and/or the circuit arrangement include more sensors than the ones already described above, for example an end position switch.

A process to control a valve according to the disclosure, especially by means of the above-mentioned circuit arrangement, comprises the steps:
   a. Measuring an air mass,
   b. Afterwards, controlling the actuator, especially an SMA element of the actuator, by means of the driver unit depending on the measured air mass,
   c. Cyclic repetition of the measurement and control until an end condition is reached.

The end condition can be or include, for example, reaching a specified air mass value and/or a specified change and/or a filling level of an air cushion, for example.

When an SMA element is heated, especially by a heating current flowing through the SMA element, its resistance changes. Such a change in resistance has been published, for example, by Song et al. in the International Workshop Smart Materials Structures & NDT in Aerospace Conference, NDT in Canada 2011 ("Resistance modelling of SMA wire actuators"). Thus, a specified change in length, especially a shortening, can be assigned to a change of a resistance. However, the resistance change is not linear, but includes linear and almost linear sections. Tests have revealed that an increase in the slope of the resistance curve when an endpoint of the actuator is reached has a sign reversal, so that the resistance curve has a reversal point, i.e. a zero crossing of the second derivative of the resistance curve. The reversal point can be determined by the comparison with the previously measured resistance value(s). A combination of detection of the reversal point and comparison with a specified absolute value increases the accuracy of the process. If a wire having another material (such as a metal) is used when the air mass is determined, then the resistance and temperature have another relationship.

The end condition can be especially selected for a normal operation in such a way that the positioning element is moved to an intermediate position near the opening or closing position, so that an endpoint of the actuator is not reached with the process according to the disclosure. This reduces the mechanical load of the valves.

Expediently, the process includes a control by means of pulse width modulation.

In an embodiment, the process additionally comprises at least one of the following steps, whereby the air mass measuring device includes at least one measuring wire:
   Measuring a resistance of the measuring wire, and/or
   Measuring a temperature and/or an ambient temperature of the measuring wire, and/or
   Measuring a heating current of the measuring wire, and/or
   Measuring an input power of the measuring wire.

The process can also include measuring the resistance of all SMA elements, whereby the measurement of the resistance of all SMA elements takes place in a joint control downtime or whereby one SMA element is measured in each case between the control of one SMA element and the control of another one, especially of the next SMA element. In this case, two or more valves are assigned to the circuit arrangement and two or more actuators are accordingly provided that include in each case one SMA element.

In another embodiment, a necessary power for activating the actuator by means of the driver unit is calculated or read from a table.

It can be provided that the measured values of the air mass measuring device and/or of the measuring device are used and by means of the stored reference values and/or a stored value table the air mass and/or the air quantity and/or a control signal for the driver unit is/are determined and/or emitted from these measured values. This can take place, for example, in the evaluation unit and/or in the control unit. Alternatively or additionally, the measured values can also be compared, for example, with reference values of a reference measurement performed in parallel, for example by means of a reference measuring wire, and the air mass and/or the air quantity and/or the control signals for the driver unit can be determined and/or emitted from them.

The valve arrangement according to the disclosure has several valves according to the disclosure. Here, the circuit arrangement addressed above to control each valve can be integrated into a joint circuit arrangement. It can be provided that all valve housings of the valves are together executed as single pieces. In particular, the valve housing enclosing in each case the valve chamber that includes an intermediate housing and/or housing cover and/or housing bottoms, are executed as single pieces.

In an embodiment, at least one first part of the several valves has a joint pressure connection that in each case leads to the valve chamber, specifically to the flow chamber, especially preferentially to a first section of the flow chambers or to a section that encompasses the first sections of the flow chambers or is in each case connected to the valve chamber, especially the flow chamber, especially preferentially to the first section of the flow chamber or the section through at least one air channel. At least a second part of the several valves can have a joint opening for connecting to the atmosphere that ends especially in the first section of the flow chamber or in a section that includes the first sections of the flow chambers or is connected to the first sections of the flow chambers. The measuring wire can, especially as SMA wire, be incorporated in each valve.

Alternately to the embodiment described above, the measuring wire cannot be incorporated in each valve of the valve arrangement either, but the wire of the air mass measuring device can be arranged in the air channel leading to the pressure connection and/or to the joint opening for connection to the atmosphere. Thus, the air mass measuring device can include in each case one measuring wire for every valve or one measuring wire together for a first part of the several valves and/or one measuring wire together for a second part of the several valves.

The air mass measuring device can be controlled in such a way that the air measurement is performed only when exactly one air valve is open. For example, the air mass measuring device is integrated in such a way into the circuit arrangement that the air mass measurement is performed exactly when one valve is open.

The seat comfort system according to the disclosure includes one or several valves according to the disclosure and/or a valve arrangement according to the disclosure and/or one or several circuit arrangements according to the disclosure and additionally one or several air cushions, whereby the filling level of each air cushion can be controlled at least via one valve. In particular, the seat comfort system is executed for installation in a seat, especially in a car seat.

BRIEF DESCRIPTION OF THE DRAWINGS

The disclosure will be explained in more detail below—also with regard to further characteristics and advantages—by describing the embodiments and with reference to the attached drawings, which show in each case in a schematic diagram.

DETAILED DESCRIPTION

Figure 1A:
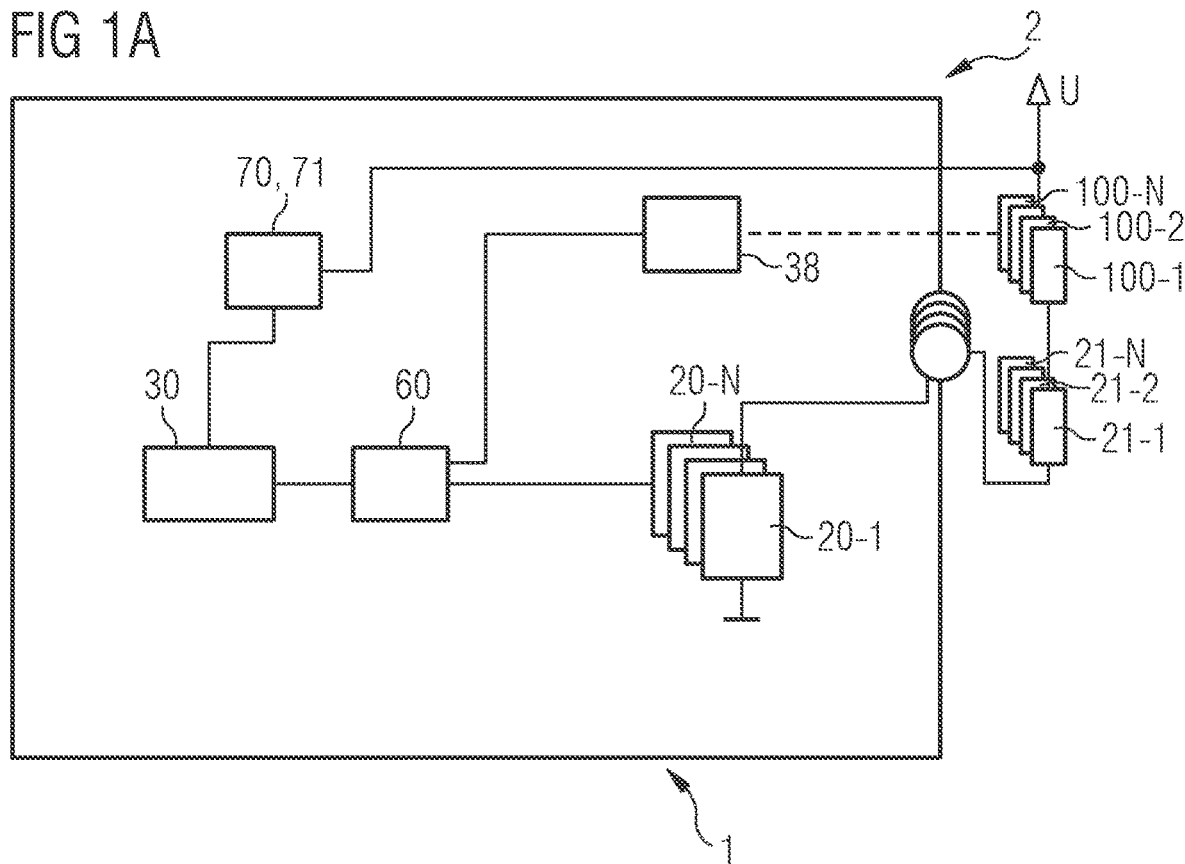
FIG. 1A shows a circuit arrangement according to the state of the art.
Figure 1B:
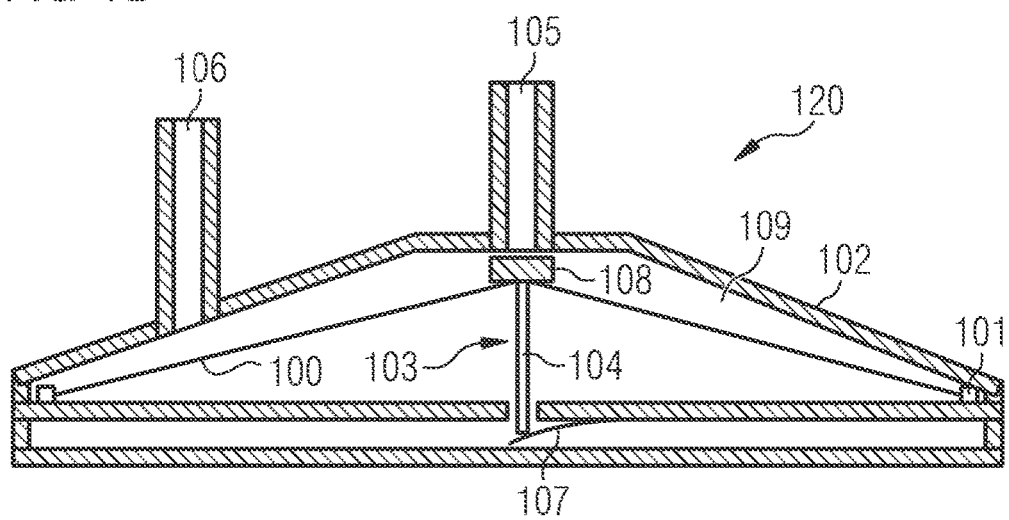
FIG. 1B shows an SMA valve with an actuator according to the state of the art.
Figure 1C:
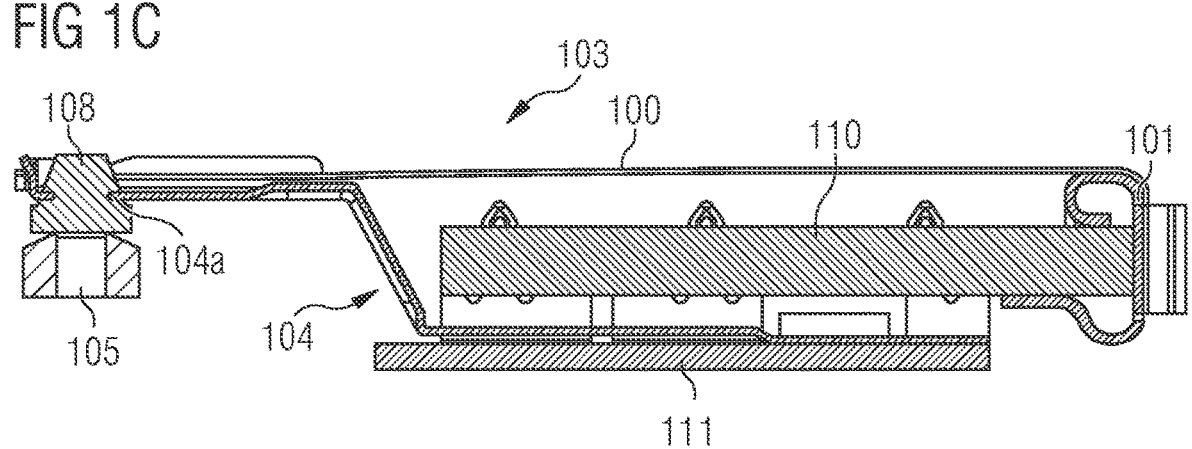
FIG. 1C shows an alternative design of an actuator of a valve according to the state of the art that was shown in FIG. 1B.

FIG. 1A, FIG. 1B and FIG. 1C show the state of the art and were already described at the beginning.

Figure 2:
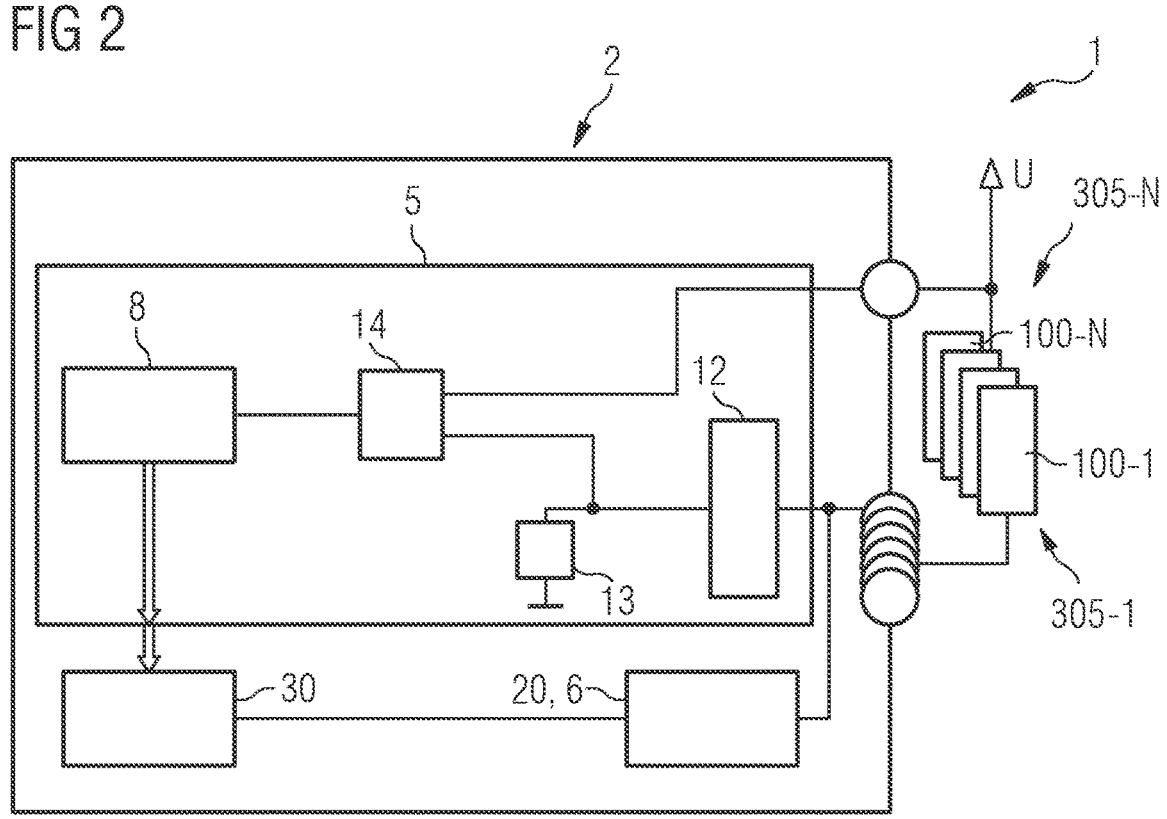
FIG. 2 shows a first embodiment of a circuit arrangement to control a valve according to the disclosure.

FIG. 2 shows a first embodiment of a circuit arrangement 1. The circuit arrangement 1 is designed together with several SMA elements 100-1 to 100-N, in particular SMA wires, which are shown especially as in FIG. 1B and FIG. 1C, in each case as part of an actuator 103 and therefore of a valve 120, for controlling several valves 120 of a seat comfort system 2.

The circuit arrangement 1 includes one measuring device 5 and one control unit 30. The measuring device 5 can be or is connected to each one of the SMA elements 100-1 to 100-N. The measuring device 5 forms an air mass measuring device 305-1 to 305-N with every one of the SMA elements 100-1 to 100-N. The measuring device 5 can be designed as resistance measuring device, temperature measuring device, current measuring device and/or power measuring device. The SMA elements 100-1 to 100-N are connected to a voltage source U indicated by the arrow. The control unit 30 can be or is permanently connected to each one of the SMA elements 100-1 to 100-N via an SMA driver 20. The SMA drivers 20 are arranged in a driver unit 6. The measuring device 5 generates an output signal that is transmitted to the control unit 30 via a cable or wirelessly and used there as input signal for controlling or regulating the SMA drivers 20.

The measuring device 5 includes optionally one multiplexer 12 which can be or is connected to each one of the SMA elements 100-1 to 100-N, so that a resistance of one of the SMA elements 100-1 to 100-N can be especially measured by applying a measuring current by means of a power source 13. Moreover, a signal amplifier 14 is expediently provided in the measuring device 5, which can have an offset correction. The measuring signal received can now be evaluated in an evaluation unit 8 to determine the air mass. In the example shown, the evaluation unit 8 is arranged in the measuring device 5. Alternately, it can be arranged as a separate part between measuring device 5 and control unit 30.

The control unit 30 of the circuit arrangement 1 shown in FIG. 2 can be designed for activating the SMA elements 100-1 to 100-N by means of pulse width modulation.

Figure 3:
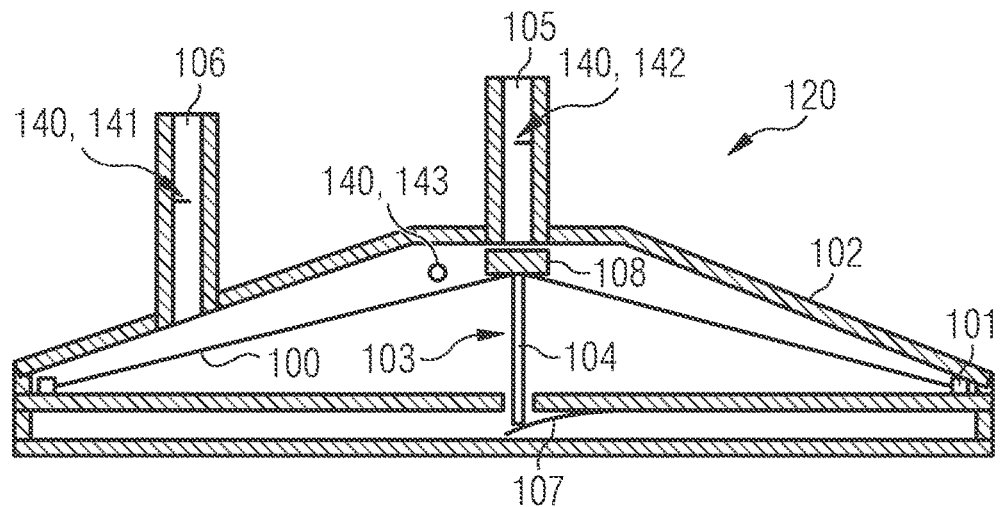
FIG. 3 shows an embodiment of a valve according to the disclosure that includes an actuator with an SMA element.

FIG. 3 shows an alternative embodiment of a valve 120. In contrast to the valve 120 according to FIG. 1B, a wire 140 separate from the SMA element 100 is arranged in this valve 120 as measuring wire in various positions in valve 120. FIG. 3 shows exemplarily three different positions, in which the wire 140 can be arranged. For example, the wire 140 can be arranged as wire 141 in the second opening 106 and/or as wire 142 in the first opening 105 of the valve 120. Alternately or additionally, the wire 140 can be arranged in a valve chamber, such as in a flow chamber of the valve, as wire 143. In this embodiment of the valve 120 shown in FIG. 3, the wire 140 can or is also alternately or additionally connected to the measuring device 5, especially as wire 141 and/or wire 142 and/or wire 143 (see FIG. 4, for example) and form in each case an air mass measuring device together with the measuring device 5.

Figure 4:
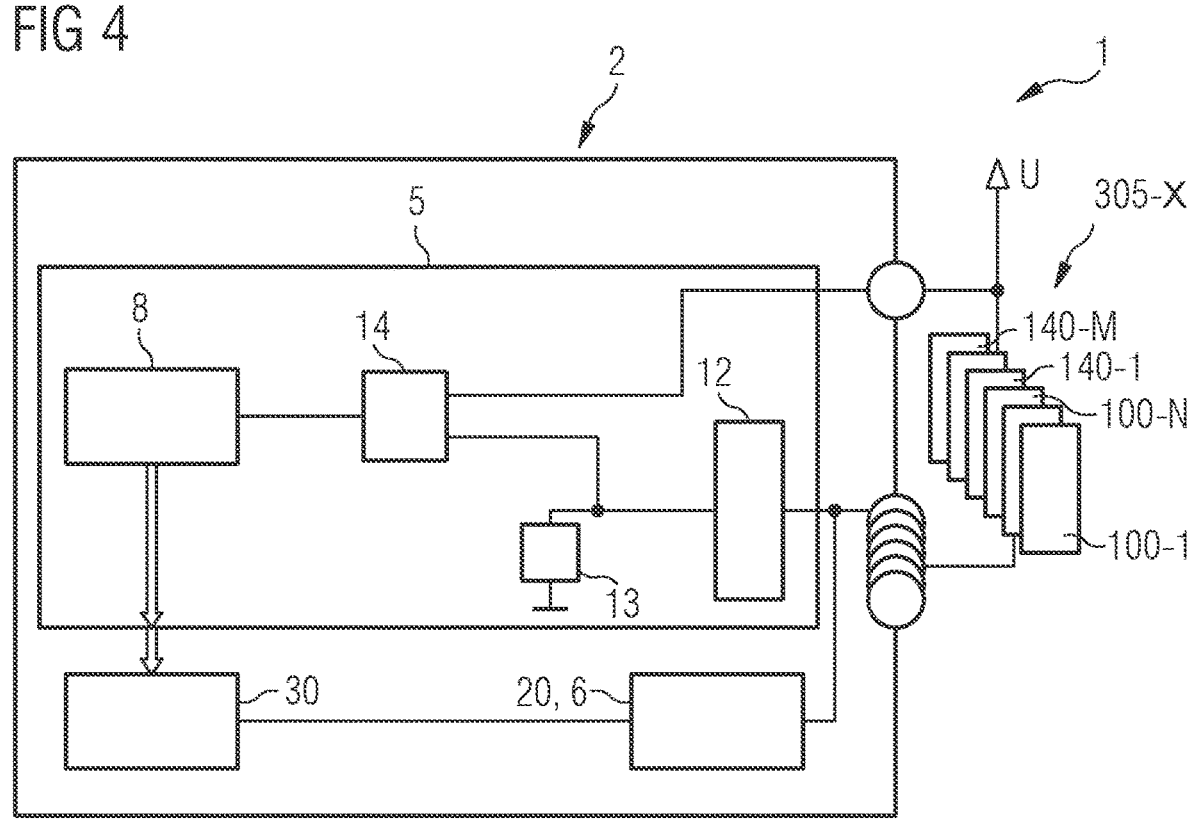
FIG. 4 shows a second embodiment of a circuit arrangement to control a valve according to the disclosure.

FIG. 4 shows a second embodiment of the circuit arrangement 1, in which in addition separate wires 140-1 to 140-M are arranged in the respective valves 120, as shown for example in FIG. 3, that just like the SMA elements 100-1 to 100-N form an air mass measuring device 305-X in each case with the measuring device 5, so that the air mass measurement can also be performed in wires 140-1 to 140-M and the control of the respective SMA element 100-1 to 100-N of the respective valve 120 takes place via the SMA driver 20 by means of this measurement. In the embodiment shown in FIG. 4, the separate wires 140-1 to 140-M are connected in parallel to the SMA elements 100-1 to 100-N, but the separate wires 140-1 to 140-M can be controlled in each case separately for performing the respective measurement. However, alternately or additionally to this control, a resistance in the SMA elements 100-1 to 100-N can also be measured, for example, by means of the circuit arrangement 1. The number M of separate wires 140-1 to 140-M and the number N of SMA elements 100-1 to 100-N can be the same or different. When alternately to an SMA element, the actuator 103 of the valve 120 controls the positioning element 104 with a piezoelectric element or a magnetic, especially electromagnetic element, this piezoelectric or magnetic element can be controlled—analogously to the SMA elements 100-1 to 100-N shown in FIG. 4—based on the respective measured values of the air mass measurement with the respective wire 140-1 to 140-M.

Figure 5:
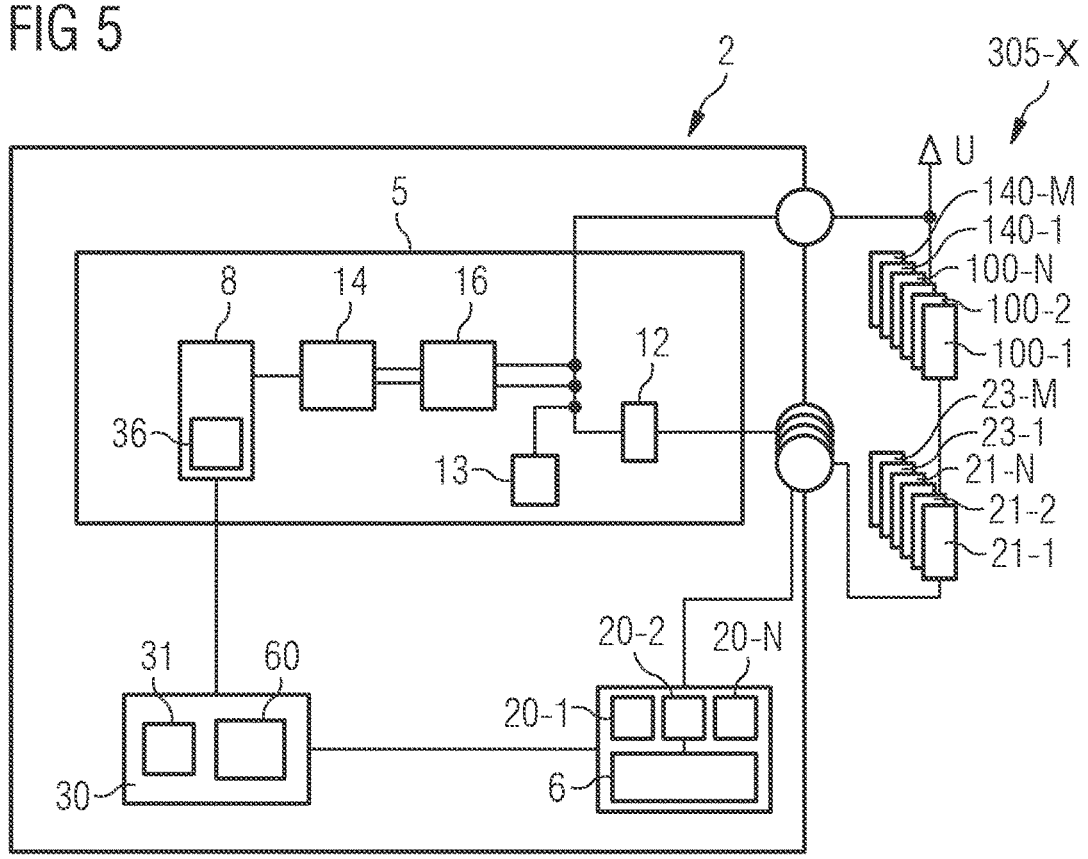
FIG. 5 shows a third embodiment of a circuit arrangement to control a valve according to the disclosure.

FIG. 5 shows a third embodiment of a circuit arrangement 1. The circuit arrangement 1 differs from the circuit arrangement 1 shown in FIG. 2 in the series resistors 21-1 to 21-N, which are in each case connected before the SMA elements 100-1 to 100-N. Optionally, as shown in FIG. 4, separate wires 140-1 to 140-M (as shown in FIG. 5) are also arranged here in addition to the SMA elements 100-1 to 100-N, before one series resistor 23-1 to 23-M is likewise connected in each case. Thus, the series resistors 21-1 to 21-N and the series resistors 23-1 to 23-M supplement in each case the respective air mass measuring device 305-X.

Furthermore, the circuit arrangement 1 according to FIG. 5 differs from the circuit arrangement 1 according to FIG. 2 in that a filter 16 is arranged in the measuring device 5 in addition to the amplifier 14. Here, several filter and amplifier levels and/or integration elements that serve to improve the signal can also be used in principle.

In the embodiment shown according to FIG. 5, the evaluation unit 8 includes a memory 36. An external memory that the evaluation unit 8 can access is also possible as an alternative or addition.

The control unit 30 includes—apart from the input 31 shown in FIG. 5, which can also be present in the other embodiments and can be executed, for example, to receive a control signal that can be transmitted wirelessly or via cable—a pulse width modulation device 60 connected to the driver unit 6 and thereby to the SMA drivers 20-1 to 20-N. Optionally, the control unit 30 can be designed for controlling the measuring device 5. As already described by means of FIG. 4, separate wires 140-1 to 140-M can also be easily integrated here into the circuit arrangement 1.

Figure 6:
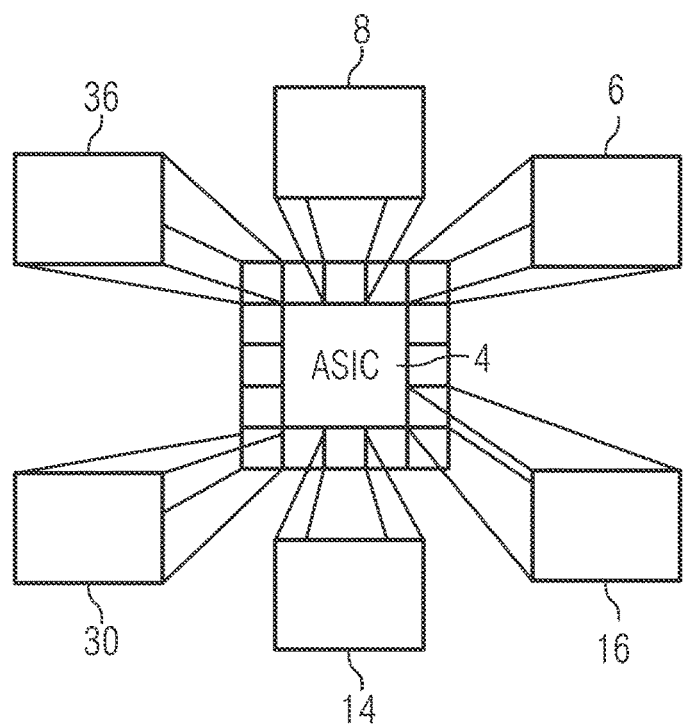
FIG. 6 shows an example of an ASIC for a circuit arrangement to control a valve according to the disclosure.

FIG. 6 shows an ASIC 4 that can be used to put into practice the circuit arrangement 1 according to the disclosure. This ASIC 4 can include the components of the measuring device 5, such as the evaluation unit 8 and/or the memory 36 and/or the amplifier 14 and/or the filter 16. Furthermore, the ASIC 4 can include the control unit 30 with the pulse width modulation device 60, for example. In addition, if the ASIC 4 includes the control unit 30, the ASIC especially also the input 31, designed for example to receive a control signal that can be transmitted wirelessly or via cable. Optionally, the ASIC 4 can also include the driver unit 6 with the SMA drivers 20.

Figure 7:
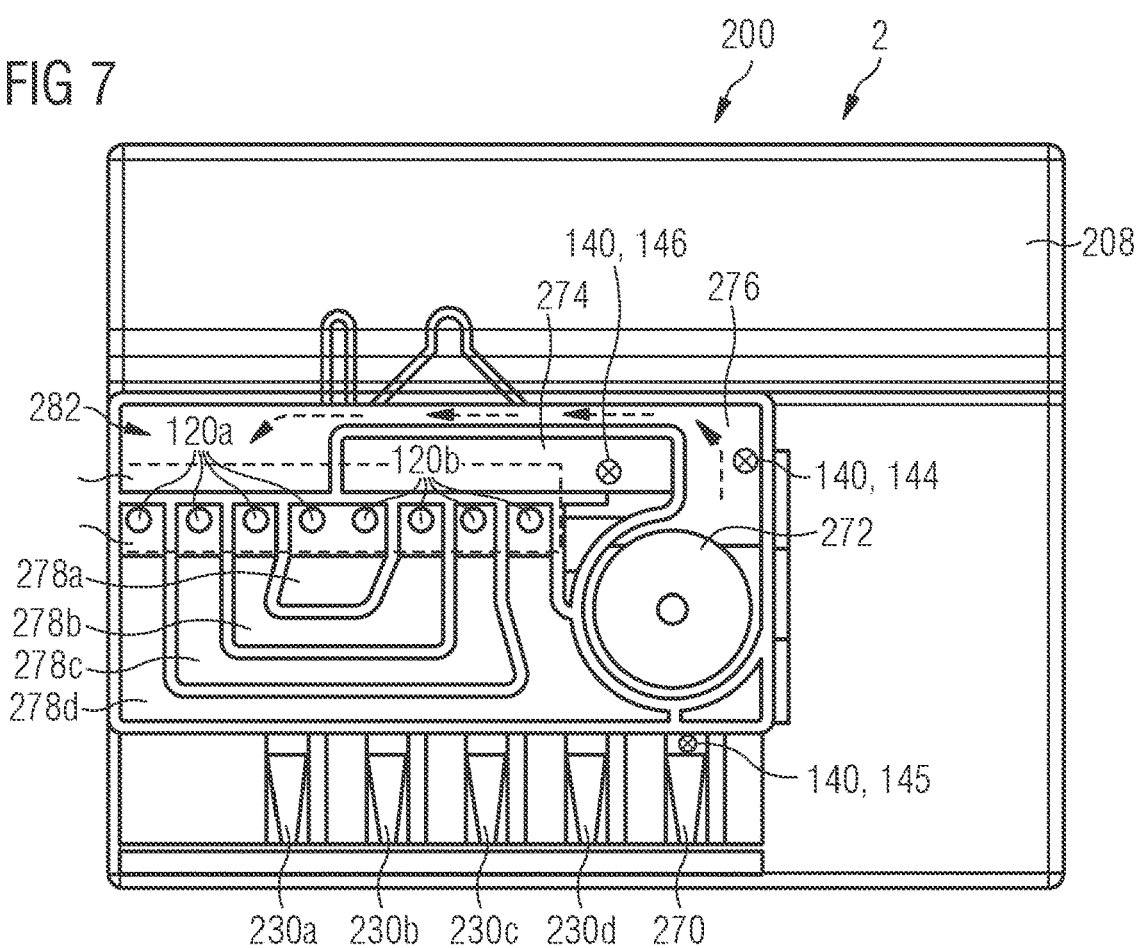
FIG. 7 shows an embodiment of a valve arrangement according to the disclosure for a seat comfort system with several valves according to the disclosure.

FIG. 7 shows a valve arrangement 200 of a seat comfort system 2 with several valves, specifically first valves 120*a* and second valves 120*b*, controlled with a circuit arrangement 1 according to the disclosure. The view shows a section of an intermediate housing 208 of the seat comfort system 2. Air (indicated by dotted arrows) is supplied to a first flow area 282 assigned to the first valves 120*a*, in this case four valves 120*a*, through an air channel 276 executed from the intermediate housing 208, via a joint pressure connection 270 that can be connected to a pneumatic pump. A check valve 272 is arranged inside the air channel 276 between the pressure connection 270 and the first flow area 282. Second valves 120*b*, in this case four second valves 120*b*, are connected via a second flow area 274 to a joint opening to the atmosphere (not shown). A valve 120*a* and a valve 120*b* are in each case connected with one another through an air channel 278*a*, 278*b*, 278*c*, 278*d* on the sides fluidically opposite to the first flow area 282 or the second flow area 274 of the valves 120*a*, 120*b*.

Air cushions can be connected to the consumer connections 230*a*, 230*b*, 230*c*, 230*d*. If an air cushion is vented, the air contained therein flows in each case initially through the respective consumer connection 230*a*, 230*b*, 230*c*, 230*d* into the assigned air channel 278*a*, 278*b*, 278*c*, 278*d* and then through the assigned opened second valve 120*b* into the second flow area 274 and from there into the atmosphere. The corresponding first valve 120*a*, which is connected to the same air channel 278*a*, 278*b*, 278*c*, 278*d*, is closed in this case. When an air cushion is filled with compressed air, air from the pressure connection 270 flows into the air cushion through the first flow area 282 and the assigned opened first valve 270*a* and the respective air channel 278*a*, 278*b*, 278*c*, 278*d* and the respective consumer connection 230*a*, 230*b*, 230*c*, 230*d*. The corresponding second valve 120*b* is in this case closed.

In other words, a first valve 120*a* and a second valve 120*b* are in each case assigned to an air cushion or generally to an air cell and connected to it, whereby the first valve 120*a* serves to fill the air cushion with air and the second valve 120*b* to empty the air cushion.

In one such system shown in an unlimited way in FIG. 7, the SMA elements can, especially the SMA wires of the valves 120*a*, 120*b* firstly be used as measuring wire of the air mass measuring device and secondly as separate wires 140 as measuring wire of the air mass measuring device. Regarding the separate wires 140, it is possible to arrange them in a section exclusively assigned to the respective valve 120*a*, 120*b*, as shown exemplarily in FIG. 3. Alternately or additionally, a wire 140 can also be arranged in a joint air channel 176, in FIG. 7 additionally indicated by reference character 144, and/or in the joint pressure connection 270, in FIG. 7 additionally indicated by reference character 145, and/or in the second flow area 174, in FIG. 7 additionally marked by reference character 146.

Figure 8:
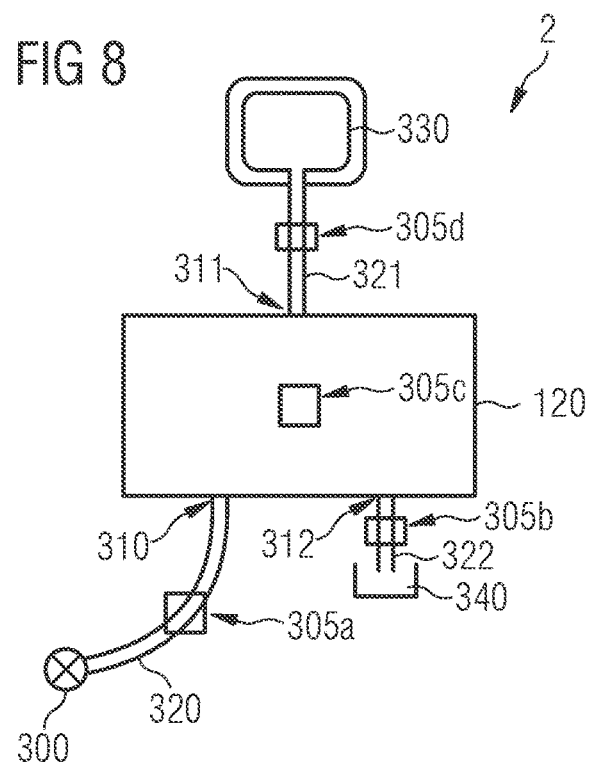
FIG. 8 shows an embodiment of a seat comfort system according to the disclosure.

FIG. 8 shows a seat comfort system 2. In the diagram shown, the seat comfort system 2 includes a valve 120 having a first valve opening 310, a second valve opening 311, and a third valve opening 312. The first valve opening 310 is connected to a pump 300 via a fluid line 320. The second valve opening 311 is connected to an air cushion 330 via a fluid line 321. The third valve opening 312 is connected to an opening to the atmosphere 340 via an additional fluid line 322. Components of one or several air mass measuring devices, especially the measuring wires of the air mass measuring devices, can be arranged in one or several of the fluid lines 320, 321, 322. Symbolically, the air mass measuring device assigned to fluid line 320 is indicated with reference character 305*a* in FIG. 8, the air mass measuring device assigned to fluid line 322 with reference character 305*b*, and the air mass measuring device assigned to fluid line 321 with reference character 305*d*. Alternately or additionally, the measuring wire of an air mass measuring device can also be arranged in the valve 120 itself. In FIG. 8, this air mass measuring device is symbolically indicated with reference character 305*c*. In a seat comfort system 2 with several air cushions 330, the several air cushions 330 can be connected to one or several valves 120. In particular, several air cushions 330 are connected to a valve arrangement 200, whereby a valve arrangement 200 such as a valve arrangement according to FIG. 7, would essentially replace the valve 120 shown in FIG. 8, and instead the one air cushion 330 shown, several air cushions 330 would be connected in parallel to the valve arrangement 200. The air mass measuring devices, especially the measuring wires of the air mass measuring devices, can then be arranged accordingly in the valve arrangement 200 and/or in the respective air channels and/or flow areas and/or fluid lines.

LIST OF REFERENCE SIGNS

1 Circuit arrangement
2 Seat comfort system
4 ASIC
5 Measuring device
6 Drive unit
8 Evaluation unit
12 Multiplexer
13 Power source
14 Signal amplifier
16 Filter
20, 20-1 to 20-N SMA driver
21-1 to 21-N Series resistance
23-1 to 23-M Series resistance
30 Control unit
31 Input
36 Memory
38 Feedback device
60 Pulse width modulation device
70 Temperature sensor
71 Voltage sensor
100, 100-1 to 100-N SMA element, e.g. SMA wire
101 Crimp
102 Valve housing
103 Actuator
104 Positioning element
104a Through-hole
105 First opening
106 Second opening
107 Limit switch
108 Sealing element
109 Valve chamber
110 Circuit board
111 Baseplate
120, 120a, 120b Valve
140, 140-1 to 140-M Wire
141 to 146 Wire
200 Valve arrangement
208 Intermediate housing
230a to 230d Consumer connection
270 Pressure connection
272 Check valve
274 Second flow area
276 Air channel
278a to 278d Air channel
282 First flow area
300 Pump
305-1 to 205-N, 305-X Air mass measuring device
305a to 305d Air mass measuring device
310 First valve opening
311 Second valve opening
312 Third valve opening
320 Fluid line
321 Fluid line
322 Fluid line
330 Air cushion
340 Opening to the atmosphere
U Voltage source

The invention claimed is:

1. A valve arrangement including several valves, each valve comprising:
    a valve housing defining at least one first opening and at least one second opening, the valve housing enclosing a valve chamber,
    an actuator with a positioning element, the positioning element being configured for opening or closing the valve, and
    at least one air mass measuring device for measuring an air mass flowing through the valve,
    wherein at least one first part of the several valves has a joint pressure connection that leads in each case to the valve chamber or is connected in each case to the valve chamber through at least one air channel and/or a first flow area,
    wherein at least one second part of the several valves has a joint opening for connection to the atmosphere, wherein the joint opening is connected to the respective valve chamber through a second flow area, and
    wherein a measuring wire of the air mass measuring device is arranged in at least one of the air channel leading to the pressure connection, the first flow area, the second flow area, and the joint opening for connection to the atmosphere.

2. The valve arrangement according to claim 1, wherein the at least one air mass measuring device includes one measuring device for measuring physical values of the measuring wire.

3. The valve arrangement according to claim 2, wherein the measuring device includes at least one of:
    a. a resistance measuring device for measuring a resistance of the measuring wire,
    b. at least one of a temperature sensor and a temperature measuring device for measuring at least one of a temperature of the measuring wire and an ambient temperature of the measuring wire,
    c. a current measuring device for measuring a heating current of the measuring wire, and
    d. a power measuring device for measuring an input power of the measuring wire.

4. The valve arrangement according to claim 2, wherein the measuring device is part of a circuit arrangement to control the valve,
    wherein the circuit arrangement has at least one drive unit to activate the actuator and a control unit to control the drive unit, and
    wherein the control unit is configured for processing an output signal of the measuring device of the air mass measuring device.

5. The valve arrangement according to claim 1, wherein the actuator of each valve has an SMA element.

6. The valve arrangement according to claim 5, wherein the SMA element is an SMA wire, the SMA wire being the measuring wire or one of the measuring wires of the air mass measuring device.

7. A seat comfort system that includes a valve arrangement according to claim 1, and additionally includes one or several air cushions, the filling level of each air cushion being controllable through at least one of the several valves.

* * * * *